UNITED STATES PATENT OFFICE.

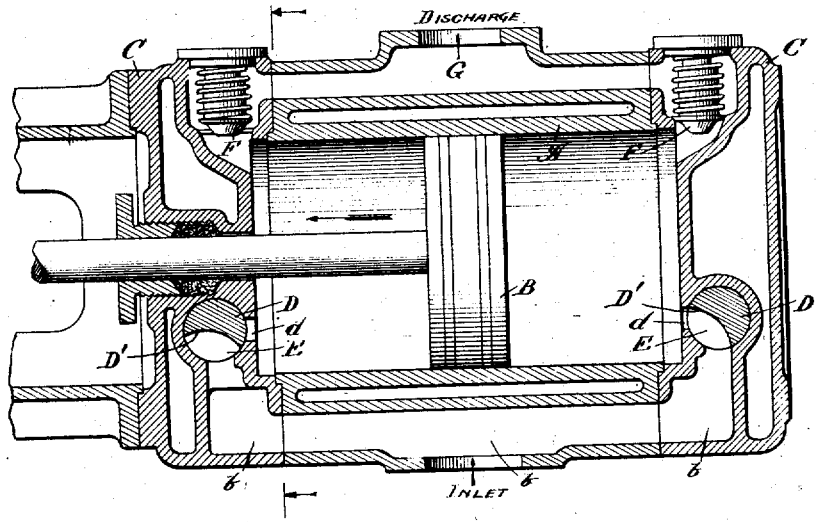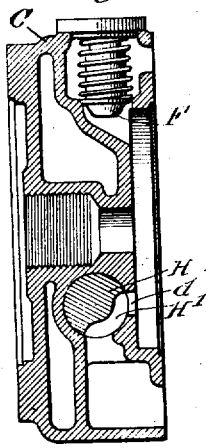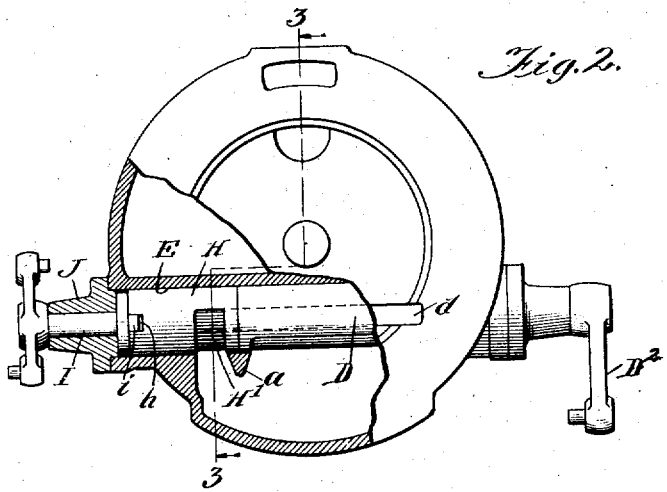

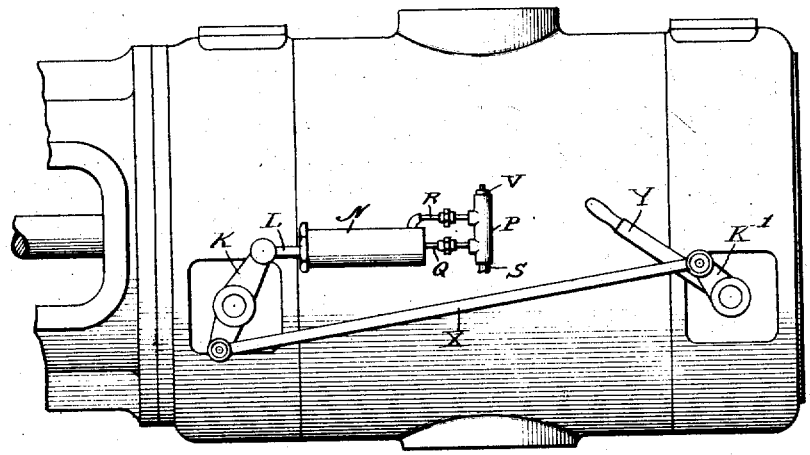
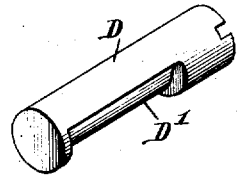
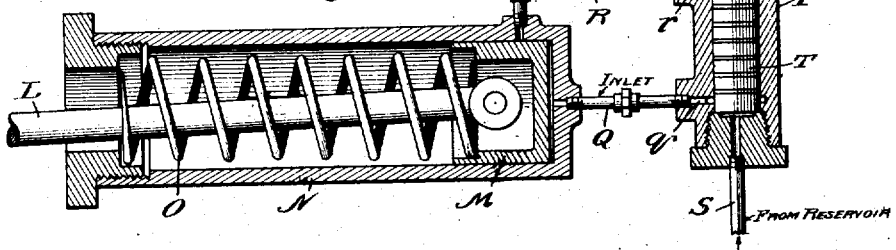

ALLAN O. CARPENTER, OF FRANKLIN, PENNSYLVANIA, ASSIGNOR TO CHICAGO PNEUMATIC TOOL COMPANY, OF CHICAGO, ILLINOIS, A CORPORATION OF NEW JERSEY.

AIR-COMPRESSOR.

972,161.  Specification of Letters Patent.  Patented Oct. 11, 1910.

Application filed January 19, 1909. Serial No. 473,174.

*To all whom it may concern:*

Be it known that I, ALLAN O. CARPENTER, a citizen of the United States, residing at Franklin, in the county of Venango and State of Pennsylvania, have invented certain new and useful Improvements in Air-Compressors, of which the following is a specification.

My invention relates to air compressors and the object thereof is to provide novel, efficient and reliable means for relieving an air compressor of its load by so controlling the passage of air to or from the compression cylinder that the amount of air delivered by the compressor may be diminished or interrupted without stopping or retarding the movements of the operating parts of the compressor, such diminution in the amount of compressed air delivered diminishing the work required of the compressor.

My unloader device may be applied to compressors which have mechanically operated rotary, or semi-rotary valves, and which are provided with valves to prevent the return of compressed air into the compression chamber. The unloader device or valve is separate from the regular rotary or semi-rotary air valve, and is operated by an independent mechanism with the result that I avoid complicated driving mechanism such as is necessary when the regular air valve itself is used also as an unloader valve. Moreover, by the construction of my unloader valve, I avoid the formation of a separate or additional passage or chamber which would add to the undesirable clearance space of the compression chamber, and make possible a simple construction and ready means of application for its operating mechanism.

Other novel and advantageous features of construction and operation will be apparent from the description hereinafter given.

In the drawings Figure 1 is a longitudinal section through the compression cylinder and cylinder heads of a compressor in which my invention is embodied; Fig. 2 an end view of one of the cylinder heads on the cylinder side showing a portion thereof broken away to expose an end of one of the air valves and my unloader valve; Fig. 3 a section on the irregular line 3—3 of Fig. 2; Fig. 4 a side elevation of the compression cylinder and the mechanism applied thereto for operating my unloader valves; Fig. 5 a section through the regulating and operating cylinders of the mechanism for operating the unloader valves; and Figs. 6 and 7 perspectives of one of the unloader valves and one of the air valves respectively.

The construction herein illustrated and now about to be described represents one of the embodiments of my invention although as will be understood my invention may be embodied in other forms or structures without departing from the spirit thereof.

The compressor elements illustrated in Fig. 1 are of the usual and well-known character comprising the compression cylinder A within which the piston B is reciprocally operated and which is closed at its ends by the cylinder heads C C. Within these heads are located the air inlet valves D D which are herein shown as of the semi-rotary type and operate in the valve chambers E E to govern the communication between the inlet chamber $b$ and the compression cylinder through the ports $d$. It will be understood that whenever in this specification, or in the claims, I refer to a "rotary" inlet valve or unloader valve, I use the term in a generic sense as applied to both the so-called rotary and semi-rotary types. In the cylinder heads are also arranged the discharge valves F F which in the present instance are of the puppet type and arranged to permit of the discharge of air compressed by the piston from the compression cylinder into the discharge chamber and passage G. The inlet valves D are operated by any desired means such as the rocker arms $D^2$ operatively connected therewith in the well-known manner; and moreover such valves are similar to the inlet valves in ordinary use with the exception that they are shortened axially so as to allow space within the valve chambers for my unloader valves H, each of which is arranged end-on and in axial alinement with its inlet valve as illustrated in Fig. 2.

It will be understood that I employ two unloader valves one for each inlet valve and as such unloader valves are similar in construction and mode of operation a description of one of them will suffice for both. By preference the meeting ends of an inlet valve and its unloader valve are located directly over a cross-piece $a$ in the communication between the inlet chamber $b$ and the valve chamber E, Fig. 2. The arrangement is such that the inlet valve D with its usual cut-away portion $d'$ is adapted to control the port $d$ practically for the greater portion of its length while the unloader valve H is adapted to govern the remainder thereof but normally closes such remaining portion. For the purpose of so governing its end of the inlet port my unloader valve is provided with a cut-away portion or groove $H'$ which is adapted to register with such inlet port and establish communication between it and the inlet chamber $b$.

For the operation of my loader valves, any suitable mechanism may be employed, the same being adapted to actuate said valves either separately or in unison, in such manner as to effect either a partial or complete removal of the load due to compression. As herein shown I provide for both manual and automatic operation of the unloader valves so that the same may be under the control of the operator, or under the control of the pressure in a reservoir into which the compressor discharges. To this end I provide a valve stem I which has its bearing in a bonnet or cap J secured in suitable manner to the end of the valve chamber and operatively connected with its unloader valve to transmit rotary motion thereto. In the present instance this valve stem is provided with a diametrical projection or rib $i$ adapted to fit into the diametrical slot $h$ in the outer end of its unloader valve. To the outer end of the valve stem is attached an operating arm or lever K which is operatively connected at one end with a corresponding arm $K'$ by means of a link X. For manual operation the last-mentioned arm $K'$ is provided with a lever or handle Y, all as clearly shown in Fig. 4. It will be understood that the movement of this handle will cause rotary motion of both of the unloader valves in unison either from a normal or inoperative position to an operative position or vice versa according to the direction of movement of the handle.

For the automatic operation of the unloader valves I provide a governing or regulating mechanism under the control of the air pressure in the reservoir (not shown) into which the compressor discharges. As shown in Figs. 4 and 5 one end of one of the arms or levers is pivotally connected to the piston rod L of a piston M which travels in a cylinder N. This piston is normally held at one end of its chamber by means of a spiral spring O which in turn holds the unloader valves in their normal or inoperative position. The piston M, however, is under the control of a governor or regulating device comprising a casing or cylinder P having communication with the cylinder N through the inlet pipe Q and exhaust pipe R respectively. The governor cylinder also has communication with the reservoir through the supply pipe S entering such governor cylinder at the lower end thereof and below the governing piston T which is adapted to reciprocate in the governor cylinder and to be moved upwardly by air pressure against the resistance of the coiled spring U pressing downwardly against the upper end of such piston. This piston also acts as a valve for the purpose of controlling the ports and passages $q$ and $r$ which communicate with the inlet and exhaust pipes Q and R respectively, said ports being formed as annular chambers or grooves in the inner walls of the governor cylinder.

Whenever the pressure delivered by the compressor into the reservoir reaches or exceeds a maximum which may be determined by the tension of the spring U, itself regulated by the adjusting nut V, such pressure will force the piston T upwardly, closing off the exhaust through the pipe R and admitting the pressure through the inlet pipe Q, with the result that the piston M will be forced outwardly against the pressure of its spring O and the two unloader valves will be simultaneously partially rotated so as to bring their cut-away portions $H'$ into register with the inlet ports $d$. The moving parts of the compressor, including the inlet valves, will operate as before, but so long as the portion of the inlet port $d$ governed by the unloader valve is thus kept open, the work of compression will be interrupted, as the following explanation will show.

It is evident that when the regular air compression action is in progress, that portion of the inlet port $d$ governed by the valve D is covered by such latter valve during the movement of the piston B on its compression stroke, and at such time the remaining portion of the inlet port is covered by the unloader valve during such movement of the piston, thus preventing communication between the compression chamber and the inlet chamber $b$ and allowing compression to take place as the piston advances, and the compressed air to be discharged in the usual manner past the discharge valves F. However, when the unloader valves are operated as just explained the relative movements of the piston and usual valve mechanisms will continue as usual but inasmuch as the unloader valves have been rotated to uncover portions of the inlet ports $d$, communication is thereby opened between the compression chamber and the inlet b, thus allowing the air in said compression chamber to pass freely to the inlet chamber as the piston advances, thus preventing compression and causing the compressor to operate without the load due to compression. When the pressure in the reservoir is reduced to the normal or predetermined amount the piston T of the governor will descend, thereby cutting off further supply of air pressure through the pipe Q and releasing the pressure from the piston M through the exhaust pipe R. The spring O will thereupon return the parts, including the unloader valves, to their normal position, with the result that the machine will thereupon act to compress and deliver air under pressure. By means of the handle Y the unloader valves may be operated by an operator or attendant at any desired time, as for instance in starting the compressor when the load should be removed therefrom.

From the foregoing description it is evident that the unloader mechanism is comparatively simple, efficient and compact and moreover contains but few parts and is easily constructed and applied. Furthermore, my unloader is particularly adapted to act in connection with rotary or semirotary air valves and is adapted to be arranged in the same valve chamber.

I claim:

1. In combination with an air compressor and its inlet port and inlet valve therefor, an unloader valve governing a portion of the inlet port and adapted to maintain such port open.

2. In combination with an air compressor and its inlet port and inlet valve therefor, an unloader valve governing a portion of the inlet port independently of the inlet valve.

3. In combination with an air compressor and its inlet port and inlet valve therefor, an unloader valve governing a portion of the inlet port and adapted to maintain such port open, and a fluid pressure governor device for operating the unloader valve.

4. In combination with an air compressor and its inlet port and inlet valve therefor, an unloader valve governing a portion of the inlet port and adapted to maintain such port open, and a fluid pressure governor actuated by the excess pressure delivered by the compressor for operating the unloader valve.

5. In combination with an air compressor and its inlet port and inlet valve therefor, an unloader valve governing a portion of the inlet port independently of the inlet valve, and means for operating the unloader valve manually or automatically.

6. In combination with an air compressor and its inlet port and inlet valve therefor, an unloader valve governing a portion of the inlet port independently of the inlet valve, said unloader valve being arranged in the same valve chamber as the inlet valve.

7. In combination with an air compressor and its inlet ports and inlet valves therefor, unloader valves governing portions of the inlet ports independently of the inlet valves, and means for operating the unloader valves.

8. In combination with an air compressor and an inlet port and with an inlet valve, an unloader valve operating independently of the inlet valve, said valves having a common valve chamber and controlling portions of said inlet port, and means for operating said unloader valve both automatically and manually.

9. In combination with an air compressor including its compression cylinder and its rotary inlet valve, a rotary unloader valve in axial alinement with the inlet valve and independently governing communication between the compression cylinder and the inlet passage.

10. In combination with an air compressor and an inlet port and with an inlet valve operating in a suitable valve chamber, an unloader valve arranged in the same valve chamber and operating independently of the inlet valve said valves controlling portions of said inlet port.

11. In combination with an air compressor including its compression cylinder and its rotary inlet valve, a rotary unloader valve in axial alinement with the inlet valve and independently governing communication between the compression cylinder and the inlet passage, said valves being arranged in the same valve chamber and abutting each other at their adjacent ends.

12. In combination with an air compressor including its compression cylinder and its rotary inlet valve, a rotary unloader valve arranged in axial alinement with the inlet valve and in the same valve chamber, said unloader valve having a cut-away portion adapted to govern communication between the compression cylinder and the inlet passage independently of the inlet valve.

13. In combination with an air compressor and an inlet port and with an inlet valve operating in a suitable valve chamber, an unloader valve arranged in the same valve chamber and operating independently of the inlet valve, said valves governing portions of said inlet port fluid pressure actuated mechanism for operating the unloader valve, and a fluid pressure governor for admitting fluid pressure to said mechanism when the pressure delivered by the compressor exceeds a predetermined degree.

14. In combination with an air compressor and an inlet port and with an inlet valve operating in a suitable valve chamber, an unloader valve arranged in the same valve chamber and operating independently of the inlet valve, said valves governing portions of said inlet port fluid pressure actuated mechanism for operating the unloader valve, a fluid pressure governor for admitting fluid pressure to said mechanism, and a hand device operatively connected with the unloader valve.

ALLAN O. CARPENTER.

Witnesses:
 WM. O. MILTON,
 F. J. FITZGERALD.